(12) United States Patent
Melville (10) Patent No.: US 7,395,967 B2
(45) Date of Patent: Jul. 8, 2008

(54) METHODS AND SYSTEMS FOR COUNTERBALANCING A SCANNING BEAM DEVICE

(75) Inventor: Charles David Melville, Issaquah, WA (US)

(73) Assignee: University of Washington, Seattle, WA (US)

(*) Notice: Subject to any disclaimer, the term of this patent is extended or adjusted under 35 U.S.C. 154(b) by 384 days.

(21) Appl. No.: 11/187,744

(22) Filed: Jul. 21, 2005

(65) Prior Publication Data

US 2007/0019906 A1    Jan. 25, 2007

(51) Int. Cl.
*G06K 7/10* (2006.01)
(52) U.S. Cl. ....................... 235/454; 359/368
(58) Field of Classification Search ................. 235/462.01–462.47, 472.01, 472.02, 472.03; 359/385, 368, 196, 224, 204; 250/205, 225, 250/234, 216, 492.21
See application file for complete search history.

(56) References Cited

U.S. PATENT DOCUMENTS

| | | | |
|---|---|---|---|
| 4,527,893 A | 7/1985 | Taylor | |
| 4,677,683 A | 6/1987 | Pferd et al. | |
| 4,767,911 A | 8/1988 | Maram | |
| 4,919,508 A | 4/1990 | Grace et al. | |
| 4,972,344 A | 11/1990 | Stoddard | |
| 4,991,971 A | 2/1991 | Geary et al. | |
| 5,011,259 A | 4/1991 | Lieber et al. | |
| 5,172,685 A | 12/1992 | Nudelman | |
| 5,317,148 A | 5/1994 | Gray et al. | |
| 5,400,267 A | 3/1995 | Denen et al. | |
| 5,625,451 A | 4/1997 | Schiff et al. | |
| 5,681,307 A | 10/1997 | McMahan | |
| 5,693,042 A | 12/1997 | Boiarski et al. | |
| 5,727,098 A | 3/1998 | Jacobson | |
| 5,742,718 A | 4/1998 | Harman et al. | |
| 5,764,874 A | 6/1998 | White | |
| 5,768,461 A | 6/1998 | Svetkoff et al. | |
| 5,822,486 A | 10/1998 | Svetkoff et al. | |
| 5,870,511 A | 2/1999 | Sawatari et al. | |
| 5,892,219 A * | 4/1999 | Minakuchi et al. | 250/205 |
| 5,907,425 A | 5/1999 | Dickensheets et al. | |
| 5,933,240 A | 8/1999 | Jurca | |
| 6,011,250 A * | 1/2000 | Minakuchi et al. | 250/205 |

(Continued)

FOREIGN PATENT DOCUMENTS

WO    WO 00/75712 A1    12/2000

OTHER PUBLICATIONS

Andersen, J. and Seibel, E. (2001). Real-time hazard detection via machine vision for wearable low vision aids. 5th Intl. Symposium on Wearable Computers IEEE ISWC 2001, 182-3.

(Continued)

*Primary Examiner*—Thien M Le
(74) *Attorney, Agent, or Firm*—Townsend and Townsend and Crew LLP (57) ABSTRACT

Methods and system for counterbalancing accelerations and/or torques caused by actuation of an actuation element and a scanning element. A scanning beam device may comprise a counterbalance to generate forces and/or torques that are substantially equal and substantially opposite to the forces and/or torque generated by the scanning of the actuation element.

25 Claims, 5 Drawing Sheets

U.S. PATENT DOCUMENTS

| | | | |
|---|---|---|---|
| 6,046,720 | A | 4/2000 | Melville et al. |
| 6,091,067 | A | 7/2000 | Drobot et al. |
| 6,211,904 | B1 | 4/2001 | Adair et al. |
| 6,222,628 | B1 | 4/2001 | Corallo et al. |
| 6,294,775 | B1 | 9/2001 | Seibel et al. |
| 6,327,493 | B1 | 12/2001 | Ozawa et al. |
| 6,329,778 | B1 | 12/2001 | Culp et al. |
| 6,388,641 | B2 | 5/2002 | Tidwell et al. |
| 6,402,743 | B1 | 6/2002 | Orszulak et al. |
| 6,411,838 | B1 | 6/2002 | Nordstrom et al. |
| 6,492,962 | B2 | 12/2002 | Melville et al. |
| 6,498,948 | B1 | 12/2002 | Ozawa et al. |
| 6,563,105 | B2 | 5/2003 | Seibel et al. |
| 6,564,087 | B1 | 5/2003 | Pitris et al. |
| 6,626,834 | B2 | 9/2003 | Dunne |
| 6,627,903 | B1 | 9/2003 | Hirayanagi |
| 6,666,860 | B1 | 12/2003 | Takahashi |
| 6,845,190 | B1 | 1/2005 | Smithwick et al. |
| 6,967,772 | B2 * | 11/2005 | Harris ................. 359/368 |
| 7,248,390 | B2 * | 7/2007 | Harris ................. 359/198 |
| 2001/0030744 | A1 | 10/2001 | Chang |
| 2001/0055462 | A1 | 12/2001 | Seibel |
| 2002/0064341 | A1 | 5/2002 | Fauver et al. |
| 2002/0088949 | A1 * | 7/2002 | Ryding ............. 250/492.21 |
| 2002/0131052 | A1 | 9/2002 | Emery |
| 2003/0010826 | A1 | 1/2003 | Dvorkis et al. |
| 2003/0086161 | A1 * | 5/2003 | Harris ................. 359/368 |
| 2003/0179428 | A1 | 9/2003 | Suzuki et al. |
| 2004/0076319 | A1 | 4/2004 | Fauver et al. |
| 2004/0113059 | A1 | 6/2004 | Kawano et al. |
| 2004/0254474 | A1 | 12/2004 | Seibel et al. |
| 2005/0162722 | A1 * | 7/2005 | Harris ................. 359/198 |
| 2007/0069679 | A1 * | 3/2007 | Sri-Jayantha et al. ....... 318/575 |

OTHER PUBLICATIONS

Brown, C. M., Fauver, M. E., Reinhall, P. G., and Seibel, E. J. (2001) Mechanical design and analysis for a scanning fiber endoscope. ASME International Mechanical Engineering Congress and Exposition. New York, NY, Nov. 11-16, 2001, BED-vol. 51: 165-166.

Fauver, M., Crossman-Bosworth, J., Seibel, E.J. (2002) Microfabrication of fiber optic scanners. Optical Scanning II, Proc. SPIE vol. 4773: 102-110.

Seibel, E.J. and Smithwick, Q.Y.J. (2000) Unique features of scanning fiber optical endoscopy. Presented at the 2000 Annual Meeting of the Biomedical Engineering Society, BMES. Seattle, WA, Oct. 12-14, 2000, Annals of Biomedical Engineering, vol. 28 suppl. 1, S-40.

Smithwick, Q.Y.J., Seibel, E.J., Reinhall, P.G, and Vagners, J. (2001) Control aspects of the scanning single fiber flexible endoscope. Proceedings of SPIE vol. 4253 International Symposium on BiOS 2001, Optical Fibers and Sensors for Medical Applications, 4253: 176-188.

Smithwick, Q.Y.L. and Seibel, E.J. (2002) Depth enhancement using a scanning fiber optical endoscope. Optical Biopsy IV, Ed. Robert R. Alfano, Proc. of SPIE vol. 4613, 222-233.

Smithwick, Q.Y.J., Vagners, J., Reinhall, P.G., Seibel, E.J. (2003) Modeling and control of the resonant fiber scanner for laser scanning display or acquisition. Society for Information Display SID 2003 Technical Digest, vol. 34: 1455-1457.

Smithwick, Quinn; Vagners, Juris; Seibel, Eric; Reinhall, Per, Modeling and Control of A Resonant Fiber Scanner for Laser Scanning Display or Acquisition, PowerPoint Presentation (33 pages), May 22, 2003, Department of Aeronautics and Astronautics and Human Interface Technology Laboratory, University of Washington.

Wang, W-C., Fauver, M., Ho, J.N., Seibel, E.J., Reinhall, P.G. (2003) Development of an optical waveguide cantilever scanner. Opto-Ireland 2002: Optics and Photonics Technologies and Applications. Proc. SPIE, vol. 4876: 72-83.

Wang, W-C, Fauver, M., Ho, J.N., Seibel, E.J., Reinhall, P.G. (2002) Micromachined optical waveguide cantilever as a resonant optical scanner. Sensors and Actuators A (Physical) 102: 165-175.

Melville, C., U.S. Appl. No. 11/187,744, filed Jul. 21, 2005.

"Engineering Study of an Endoscope Design," *Human Interface Technology*, <www.hitl.washington.edu/research/endoscope/> (Sep. 30, 2004).

"Micro-Optical Fabrication of a Fiber Scanning System," *Human Interfact Technology*, <www.hitl.washington.edu/projects/mfafiber/> (Sep. 29, 2004).

"Q factor" from *Wikipedia, The Free Encyclopedia*, May 20, 2004, <www.en.wikipedia.org/wiki/Q_factor> (Jun. 22, 2004).

Johnson, Brent, "Grating Shrinks Endoscope," *Photonics Spectra*, (Oct. 2003), <www.photonics.com/spectra/applications/QX/ASP/aoaid.335/QX/read.htm> (Sep. 30, 2004).

Seibel, E. et al., "Prototype Scanning Fiber Endoscope," presented at *SPIE BiOS*, San Jose, CA (Jan. 2002).

Seven, Richard, "At the UW Hit Lab, There's Virtue in Virtual Reality," Seattletimes.com, Apr. 11, 2004, <www.seattletimes.nwsource.com/pacificnw/2004/0411/cover.html> (Jun. 9, 2004).

Tearney, G. et al., "Scanning Single-Mode Fiber Optic Catheter-Endoscope for Optical Coherence Tomography," *Optics Letters*, 21(7):543-545 (Apr. 1, 1996).

Johnston, R., U.S. Appl. No. 10/956,473, filed Oct. 1, 2004.
Johnston, R., U.S. Appl. No. 10/956,241, filed Oct. 1, 2004.
Johnston, R. et al., U.S. Appl. No. 11/021,981, filed Dec. 23, 2004.
Johnston, R. et al., U.S. Appl. No. 11/065,224, filed Feb. 23, 2005.
Johnston, R. et al., U.S. Appl. No. 11/094,017, filed Mar. 29, 2005.

* cited by examiner

METHODS AND SYSTEMS FOR COUNTERBALANCING A SCANNING BEAM DEVICE

BACKGROUND OF THE INVENTION

The present invention is directed to scanning beam devices. More specifically, the present invention is related to methods and systems for counterbalancing a drive assembly in a scanning fiber device.

There is a growing market for micro-optical displays and small image acquisition systems (e.g., cameras). Scanning beam systems fill the need, but the lack of low cost micro-optical systems with a wide field of view (FOV) have been the most significant barrier for reducing the size of scanning beam systems for use in minimally invasive medical imaging (flexible endoscopes), surveillance, industrial inspection and repair, machine and robotic vision systems, and micro-barcode scanners.

To that end, an improved scanning beam system has recently been developed by the University of Washington which involves the use of a cantilevered optical fiber that is scanned in one or two dimensions to project light out of the end of the optical fiber to form an image on a target area. In addition to image formation and micro-display applications, image acquisition is also possible with the addition of a sensor, such as a photosensor. To acquire an image, the light projected out the end of the cantilevered, scanning optical fiber is reflected from the target area and the backscattered light is captured and measured with the sensor in time series. Because the motion of the optical fiber is predictable and repeatable, the reflected light intensity measured at the sensor can be sequentially correlated with the known position of the optical fiber, and a two-dimensional image may be created one 'pixel' at a time. Some exemplary scanning fiber devices of such type are described in U.S. Pat. No. 6,294,775 B1 (Seibel) and U.S. Pat. No. 6,563,105 B2 (Seibel) and U.S. Patent Application Publication Nos. 2001/0055462 A1 (Seibel) and 2002/0064341 A1 (Seibel), the complete disclosures of which are incorporated herein by reference.

In comparison to traditional scanning beam devices, scanning fiber technology offers many advantages. The small mass of the optical fiber scanner allows high scan angles at video rates—typically between about 1 kHz and about 50 kHz, and preferably between about 5 kHz and about 25 kHz. Optical fiber scanners also have a smaller 'footprint', taking up less space and can be conveniently packaged into a small (<1 mm) diameter cylindrical endoscope or catheter housing.

While the scanning fiber systems have proven to be useful, improvements are still needed. For example, current scanning fiber systems that scan the optical fiber about two-axes typically include an actuation element or drive assembly coupled to the scanning element. The scanning element (e.g., optical fiber) extends from a distal end of the drive assembly so that actuation of the drive assembly causes the optical fiber to move in a periodic motion that substantially corresponds to the motion of the drive assembly. As can be appreciated, actuation of the drive assembly will often cause transverse forces (e.g., accelerations) and torques to the scanning fiber device which may detrimentally affect image formation and image acquisition of the target area. There is also a relatively very small axial force on the fiber. This small axial force is caused by the distal tip of the drive assembly and the scanning fiber moving in an arc in one axis, or part of a spherical surface in two axes. This small axial force, and subsequent small movement, does not typically affect the scan quality.

In order to stabilize the drive assembly and to decrease the free end amplitude of motion of the drive assembly, it was found that a stationary object may be attached to a proximal end of the drive assembly. Preferably, the stationary object is typically many times more massive (e.g., typically between about twenty times as massive and forty times as massive) than the drive assembly and the optical fiber. While such a solution may be useful for larger scanning fiber devices, because the dimensions of small scanning fiber devices (e.g., flexible endoscope) are so small, it may not be possible to place a mass of an appropriate size within the housing of the scanning fiber device to minimize the drive assembly's proximal end attachment movements.

Consequently, what are needed are methods and devices that can counterbalance the forces and/or torque created by the movement of the drive assembly and scanning element.

BRIEF SUMMARY OF THE INVENTION

The present invention provides methods, systems and devices for counterbalancing drive assembly and scanning element of a scanning beam device. The counterbalancing may be carried out with a "virtual mass" and does not require a large mass to counterbalance the drive assembly and scanning element. Consequently, the low-profile size of the housing of the scanning beam device may be maintained.

In one embodiment the present invention provides a scanning beam device that comprises an actuation element coupled to a beam scanning element. The actuation element generates a transverse force and/or a torque to move the beam scanning element along one or more axes of motion. The scanning beam device further includes a counterbalance that is coupled to the actuation element that generates a force and/or torque that is substantially equal and substantially opposite to the transverse force and/or torque generated by the actuation element.

In another embodiment, the present invention provides a scanning beam device that comprises actuation means for generating an actuation force and/or torque to actuate movement of beam scanning means. Counterbalancing means generate a counterbalancing, force and/or torque that is substantially equal and substantially opposite to the actuation, force, and/or torque generated by the actuation means.

The present invention further provides methods of counterbalancing a scanning beam device. The method comprises providing a scanning beam device that has a beam scanning element coupled to an actuation element, and a counterbalance operatively coupled to the actuation element. The beam scanning element is actuated with at least one of a force and torque provided by the actuation element. The force and/or torque provided by the actuation element is counterbalanced with a force and/or torque that is substantially equal and substantially opposite to the force and/or torque provided by the actuation element.

The present invention further provides an open loop control system for driving the counterbalance. In an open-loop control system, an input drive signal is used to control both the drive assembly and the counterbalance. The input drive signal may be sent to a counterbalance control, where an algorithm may be used on the input drive signal to generate an output drive signal for the counterbalance. Based on the output drive signal, the counterbalance will generate forces and/or torques that are substantially equal and opposite to the forces and/or torques generated by the drive assembly.

In another embodiment, the present invention provides a closed loop control system for driving the counterbalance. The closed-loop control system is similar to open-loop the open loop control system described above, except that the closed-loop system comprises one or more sensors that are used to detect the motion of an attachment point between the drive assembly and the counterbalance. If the sensor detects motion at the attachment point, then an output signal is sent to counterbalance control with a signal indicating the type and magnitude of movement at the attachment point. Based on the output signal from the sensor(s), the algorithm(s) stored in the counterbalance control may then determine the appropriate output drive signal to send to the counterbalance to compensate for the movement at the attachment point. In some configurations, the closed loop control system may also be able to compensate for system perturbations.

Other aspects, objects and advantages of the invention will be apparent from the detailed description that follows.

DETAILED DESCRIPTION OF THE INVENTION

The present invention provides methods and scanning beam devices that comprise a counterbalance to counterbalance forces and/or torques caused by the drive assembly and by the actuation of the scan element.

Scanning beam systems of the present invention generally include a scanning beam device and a base station for controlling the scanning beam device. The scanning beam devices of the present invention may take on a variety of forms, but are typically in the form of a flexible or rigid endoscope, catheter, fiberscope, microscope, or a boroscope. The scanning beam devices of the present invention may be a limited use device (e.g., disposable device) or a multiple-use device. If the device is for medical use, the scanning beam devices of the present invention will generally be sterile, either being sterilizable or being provided in hermetically sealed package for use.

The scanning beam devices of the present invention include a scanning element for scanning a beam of light onto a target area. The scanning element preferably comprises a single, cantilevered optical fiber. For ease of reference, the terms "scanning beam system" and "scanning fiber system" will be used generally to encompass systems that are used for image display and/or image acquisition.

Figure 1:
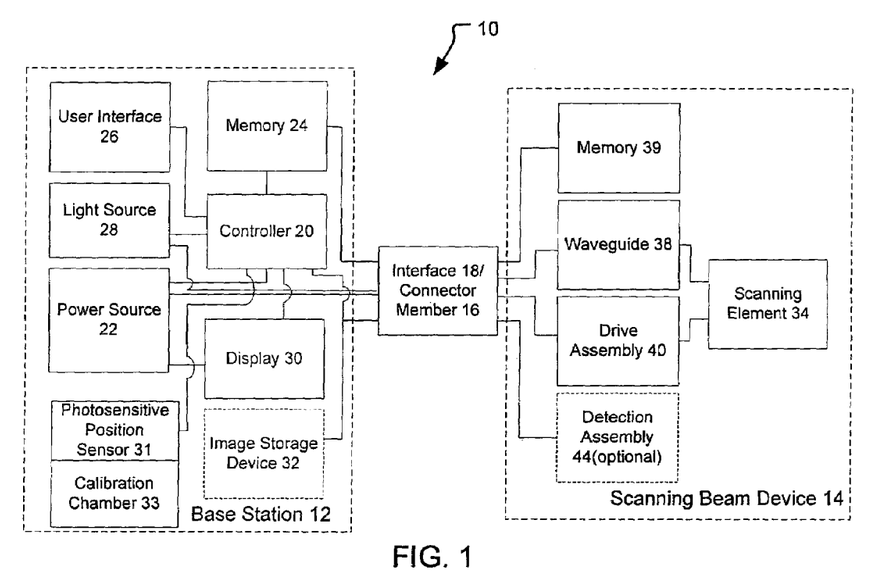
FIG. 1 schematically illustrates a simplified scanning beam system that is encompassed by the present invention.

FIG. 1 is a block diagram of one scanning beam system 10 that is encompassed by the present invention. The scanning beam system 10 includes a base station 12 and a scanning beam device 14. The scanning beam device 14 includes a connector member 16 that is configured to mate with an input interface 18 on the base station. Coupling of the connector member 16 to the input interface 18 may create a power path, drive signal path, detector path, illumination path, and/or data communication path between elements of the base station 12 and related elements of the scanning beam device 14.

As shown in FIG. 1, base station 12 typically includes a controller 20 that has one or more microprocessors and/or one or more dedicated electronics circuits which may include a gate array (not shown) which may control the actuation of the scanning beam device 14 and generation of the images. Controller 20 may also include scanner drive electronics, detector amplifiers, D/A converters, and A/D converters (not shown). The drive electronics in controller 20 and the software modules stored in memory may be used to provide a customized control routine for the scanning beam device 14. As will be appreciated by those of skill in the art, the methods of the present invention may be carried out by the software modules, the electronics hardware in the controller, or a combination thereof.

Controller 20 is in communication with a plurality of components within the base station 12 via a communication bus (not shown). The communication bus typically allows for electrical communication between controller 20, a power source 22, memory 24, user interface(s) 26, one or more light sources 28, one or more output displays 30, and a photosensitive position sensor 31 that is coupled to a calibration chamber 33. Optionally, if the scanning beam device 14 includes a detector assembly, the base station 12 may include a separate image storage device 32 in communication with controller 20. In alternative embodiments, the image storage device 32 may simply be a module within memory 24. As can be appreciated, the base stations 12 of the present invention will vary, and may include fewer or more elements than illustrated in FIG. 1.

Depending on the particular configuration of the scanning beam device 14, the light source 28 may emit a continuous stream of light, modulated light, or a stream of light pulses. Base station 12 may comprise a plurality of different light sources 28 so as to be able to operate different scanning beam devices that have different illumination capabilities. The light sources 28 may include one or more of a red light source, blue light source, green light source (collectively referred to herein as a "RGB light source"), an IR light source, a UV light source, and/or a high intensity laser source (typically for a therapeutic scanning beam device). The light sources 28 themselves may be configured to be switchable between a first mode (e.g., continuous stream) and a second mode (e.g., stream of light pulses). For ease of reference, other conventional elements in the light source are not shown. For example, if a RGB light source is used, the light sources may include a combiner to combine the different light before it enters the scanning element of the scanning beam device 14.

Memory 24 may be used for storing the software modules, look-up tables, counterbalancing control algorithms, and other algorithms that control the operation and/or calibration of the scanning beam device 14. The control routine used by the controller 20 for controlling and counterbalancing the scanning beam device 14 will typically be configurable so as to match the operating parameters of the attached device (e.g., resonant frequency, voltage limits, zoom capability, color capability, etc.). As noted below, memory 24 may also be used for storing the image data received from the detector assembly 44 of the scanning beam device, remapping look-up tables and algorithms, remapped drive signals, parameters of the scanning beam device, etc.

For ease of reference, other conventional elements in the base station 12 are not shown. For example, embodiments of the base stations 12 of the present invention will typically include conventional elements such as amplifiers, D/A converters and A/D converters, clocks, waveform generators, and the like. A more complete description of the base stations, and its interaction with the scanning beam devices are more fully described in commonly owned U.S. patent application Ser. No. 10/956,241, entitled "Remapping Methods to Reduce Distortions in Images," filed Oct. 1, 2004 and U.S. patent application Ser. No. 10/956,473, entitled "Configuration Memory for a Scanning Beam Device," filed Oct. 1, 2004, U.S. patent application Ser. No. 11/021,981, entitled "Methods of Driving a Scanning Beam Device to Achieve High Frame Rates," filed on Dec. 23, 2004, U.S. patent application Ser. No. 11/021,981, entitled "Methods of Driving a Scanning Beam Device to Achieve High Frame Rates, filed on Dec. 23, 2004, and U.S. patent application Ser. No. 11/065,224, entitled "Scanning Beam Device with Detector Assembly," filed on Feb. 23, 2005, the complete disclosures of which are incorporated herein by reference.

The scanning beam devices 14 of the present invention includes a scanning element 34 for delivering and scanning a beam of light onto the target area. A waveguide 38, typically in the form of an optical fiber (which may be a continuation of scanning element 34), is optically coupled to the light source (s) so as to deliver illumination from the light source 28 to the scanning element 34. An actuation element or driving assembly 40 is coupled to the scanning element 34 and is adapted to actuate the scanning element 34 according to a drive signal received from the controller 20. Optionally, the scanning beam device 14 may include a non-volatile memory 39 for storing identification data or parametric data of the scanning beam device 14. While not shown in FIG. 1, the scanning beam device 14 will typically include an optical assembly that directs and focuses the light directed out of a distal tip of the scanning element 34.

Figure 2:
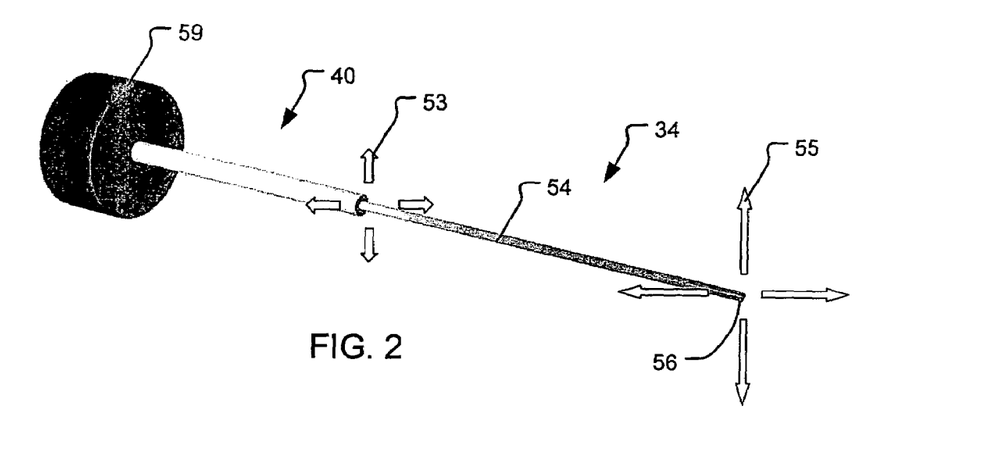
FIG. 2 is a close up of a distal end of a scanning beam device that comprises a drive assembly and a scanning element that is an optical fiber.
Figure 3:
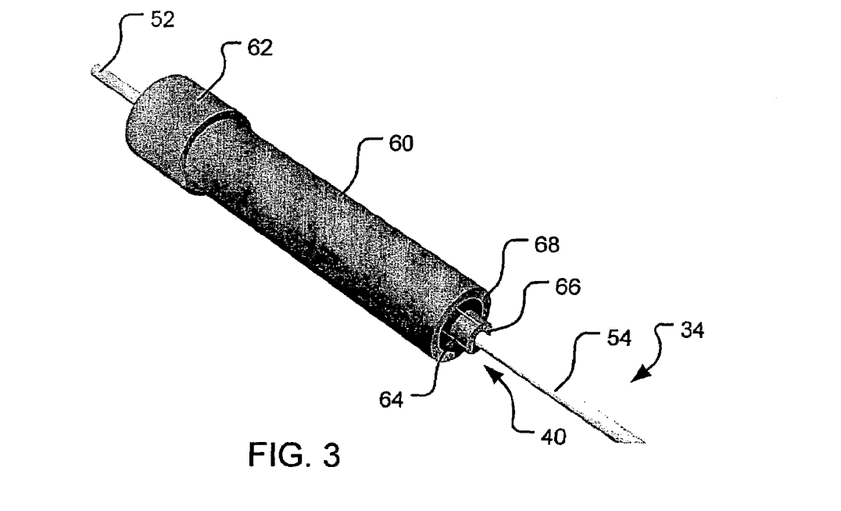
FIG. 3 illustrates one embodiment of the present invention in which a counterbalance is coaxially disposed around the drive assembly.
Figure 4:
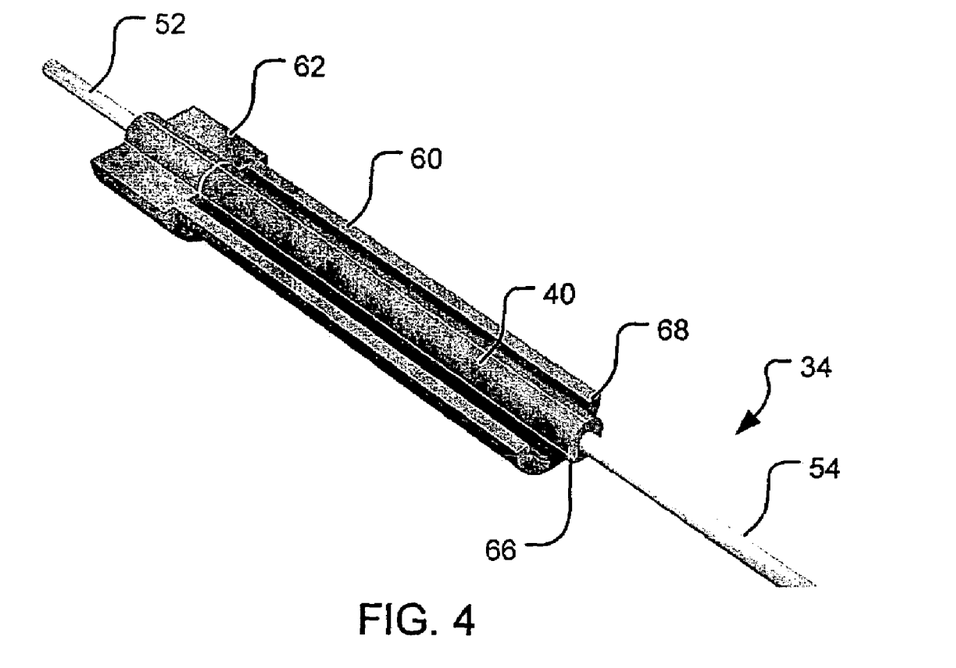
FIG. 4 is a cutaway of FIG. 3 which illustrates a proximal attachment point between the counterbalance and the drive assembly.

In one currently preferred embodiment, the scanning element 34 is a cantilevered optical fiber and the drive assembly 40 is a piezoelectric "tube bender." As shown in a simplified embodiment of FIG. 2 to 4, the optical fiber scanning element 34 comprises a proximal portion 52 (shown in FIGS. 3 and 4) and a distal portion 54 that comprises a distal tip 56. Optical fiber 34 is typically fixed along at least one point of the optical fiber so as to be cantilevered such that the distal portion 54 is free to be deflected in its desired scan pattern. In such an embodiment, the proximal portion of the optical fiber is the waveguide and will transmit light from light source 28 (FIG. 1). As can be appreciated, in other embodiments, a separate waveguide may be optically coupled to the proximal portion of the optical fiber 34 so that illumination from light source 28 will be directed into the core of optical fiber 34 and out of the distal tip 56.

The optical fiber 34 may have any desired dimensions and cross-sectional profile. Depending on the desired characteristics of the device, the optical fiber 34 may have a symmetrical cross-sectional profile or an asymmetrical cross-sectional profile. An optical fiber 34 with a round cross-sectional profile will have substantially the same resonance characteristics about any two orthogonal axes, while an optical fiber with an asymmetric cross-sectional profile (e.g., ellipse) will have different resonant frequencies about the major and minor axes. If desired, the optical fiber 34 may be linearly or non-linearly tapered along its longitudinal length.

To achieve the deflection of the distal portion 54 of the optical fiber, the cantilevered distal portion 54 of the optical fiber 34 will be coupled to drive assembly 40, which is shown in FIG. 2 as a cylindrical, piezoelectric tube bender. Drive assembly 40 will typically move in one or two dimensions (as indicated by the arrows 53) to drive the cantilevered distal portion 54 in a one or two dimensional scan pattern (as shown by arrows 55) at a frequency that is within a Q-factor of the resonant frequency of the distal portion of the optical fiber, and preferably at its mechanical or vibratory resonant frequency (or harmonics of the resonant frequency). As can be appreciated, the scanning element 34 does not have to be driven at substantially the resonant frequency, but if the scanning element 34 is not scanned at its resonant frequency, a larger amount of energy will be required to provide the desired radial displacement for the scan pattern.

In one preferred embodiment, the drive assembly is a piezoelectric drive assembly. A drive signal from controller 20 delivers a desired signal to the drive assembly 40 and the drive signal causes the piezoelectric drive assembly 40 to deflect the distal tip 56 of the optical fiber 34 so that the illumination spot is scanned in a desired scan pattern. While preferred drive assemblies are piezoelectric assemblies, in alternative embodiments, the drive assembly 40 may comprise a permanent magnet, a electromagnet, an electrostatic drive, a sonic drive, an electro-mechanical drive, or the like.

Actuation of the drive assembly 40 and movement of the scanning element 34 typically causes one or more transverse forces and/or torques to the scanning beam device. As can be appreciated, such transverse forces and/or torques will be transferred to a proximal attachment of the drive assembly. However, to be able to have an imaging scan that is repeatable, the drive assembly proximal attachment must be attached to an object that is stable —that is, the proximal attachment should not be perturbed or vibrated by the drive assembly, or it should have a low velocity that is constant (which would be the case when the scanning beam device as a whole is moved). If the proximal attachment is moving in a certain pattern and then changes its pattern (e.g., caused by the forces and/or torques caused by the drive assembly and actuation of the scanning beam element), then the scanning beam device will also change its pattern, thus changing how the imaging scan is carried out. When the imaging scan is changed, the changed scan pattern will no longer match the remap correction table that is stored in memory 76,24 and the resultant image that is generated will not be accurate.

For larger scanning beam device, as shown in FIG. 2, a mass 59 may be coupled to a proximal end of the drive assembly 40 to passively balance the forces and/or torques caused by the drive assembly 40 and actuation of the scanning element 34. For smaller scanning beam devices, however, to counterbalance the transverse forces and/or torque, a "virtual mass" may be used to generate forces and/or torques that are substantially equal and substantially opposite to the forces and torques generated by the drive assembly. FIG. 3 shows one embodiment of a counterbalance 60 for a cylindrical drive assembly 40 that is in the form of a piezoelectric bender tube. FIG. 4 shows the counterbalance 60 with one half cut away to show the inner, piezoelectric bender tube drive assembly 40. By applying Newton's Third Law, if the counterbalance 60 is perfectly configured it will generate forces and/or torques that are equal and opposite to the forces and/or torques generated by the drive assembly 40 and it would be observed that that attachment point 62 of these two objects will not move.

In order to assess the quality of the mass or virtual mass, one may look at the mechanical impedance of the scanning beam device 14. Mechanical impedance is defined as "the ratio of force to velocity, where the velocity is a result of that force only." If the object (e.g., mass or virtual mass) attached to the proximal end of the drive assembly 40 has a low mass, the system will have a low mechanical impedance because of the high velocities caused by the applied forces from the drive assembly. In contrast, a very large mass will yield high mechanical impedance that has low mass velocities. The counterbalances 60 of the present invention typically acts like a very large mass because the velocities will be very low. If the attachment mass is low, then the environment that the system as a whole encounters has a large affect on the attachment mechanical impedance. So, if the scanning beam device 14 comprises a counterbalance 60, the attachment velocities remain the same, as does the scanning beam pattern.

The drive assembly 40 shown in FIGS. 3 and 4 is in the form of a piezoelectric tube bender that has electrodes that are positioned so that a distal, free end of the tube bender drive assembly 40 can be actuated to move in all directions (e.g., moved 360° in a plane of the distal end face) relative to the counterbalance 60. To accomplish this motion, electrodes 64 are patterned in quadrants around a circumference of the piezoelectric tube bender 40. A wire (not shown) runs from the controller 20 to each of the quadrants. The conductive lining of the inside of the piezo tube (which is not divided into quadrants) is typically the common return path for all the quadrants. Since typically the quadrants are energized in opposing pairs with opposite polarity of equal voltages, the inside of the piezo tube does not have to be the return path, but floats in voltage near zero volts. The paired quadrants act like two identical capacitors in series, with the common connection being ½ the applied voltage.

In the illustrated embodiment, the counterbalance 60 is disposed coaxially around the tube bender drive assembly 40. In this embodiment, the counterbalance 60 is in the form of a second piezoelectric tube bender of a similar shape as the drive assembly 40. While the illustrated embodiment provides two coaxially disposed piezoelectric tubes, it should be appreciated that the present invention is not limited to such a configuration. For example, in other embodiments, the drive assembly 40 may be a solid element, and may have any type of cross-section (e.g., round, square, ellipse, polygon, free form, etc.) and the counterbalance 60 may have similar shape or a different shape from the drive assembly. (For example, for a lower quality counterbalancing effect, the drive assembly may have a round cross section and the counterbalance could have a square cross-section, or vice-versa).

Irregardless of the shape, in order to correctly counterbalance the forces and/or torques caused by the drive assembly and the actuation of the scanning element, the counterbalance should be properly positioned in relation to the drive assembly and scanning beam assembly. If the counterbalance shape is incorrect (relative to the drive assembly), and/or placed incorrectly, the counterbalance 60 will not counter the forces and/or torques as desired. In fact, the counterbalance 60 may produce new undesired forces from the misalignment.

In one preferred embodiment of two axis of motion, the drive assembly and the counterbalance are objects with radial symmetry (with the best being circular in cross section), and the attachment between the counterbalance 60 and drive assembly 40 are made so that the axes of symmetry coincide. Additionally, the centers of mass of both the drive assembly 40 and counterbalance 60 coincide, so as to provide for maximum counterbalancing. If the center of masses do not exactly coincide, some counterbalancing is still is being performed, but at a much lower quality.

The masses of the drive assembly 40 and the counterbalance 60 may or may not be equal. In cases where the masses of the drive assembly 40 and counterbalance 60 are not equal, such a combination requires the drive assembly 40 and counterbalance 60 to have different accelerations and velocities to provide the appropriate counterbalance. But, if the masses are equal, the accelerations and velocities will be the same.

The drive assembly 40 and counterbalance 60 do not have to based on a piezoelectric material, and instead they may be a permanent magnet, an electromagnet, an electrostatic drive, a sonic drive, an electro-mechanical drive, electro-restrictive, magneto-restrictive, or a combination thereof, so as to counterbalance cyclic movement caused by actuation of the drive assembly.

As shown in FIGS. 3 and 4, the bender tube drive assembly 40 and the counterbalance 60 are preferably attached only at their proximal ends—which is the stationary end and the distal end of the bender tube drive assembly 66. In such a configuration, the counterbalance 60 and drive assembly 40 are spaced from each other (except for at the attachment point 62) so as to allow a distal end 68 of the counterbalance 60 and a distal end 66 of the drive assembly 40 to move relative to each other. In preferred embodiments, the counterbalance 60 is also patterned in quadrants like the bender tube drive assembly 40 that actuates the optical fiber scanning element 34.

While the illustrated embodiment of FIGS. 3 and 4 show the counterbalance 60 and drive assembly 40 coupled at their proximal ends, it may be possible to provide a connection between the counterbalance 60 and drive assembly 40 at a different point. For example, the drive assembly generates a force at distal end 66. If the drive assembly 40 was coupled to the counterbalance 60 at or near its longitudinal center, such an attachment point would reduce the drive assembly's ability to generate the desired force (and deflection) at its distal end 66. Specifically, in the case of a piezoelectric drive assembly, if the center of the piezoelectric drive assembly was coupled to the counterbalance 60, only half as much force would be generated at the distal end of the drive assembly 40. Since force is required to scan the scanning element 34, half of the force will move the scanning element less, which is generally not desirable.

Furthermore, while the illustrated embodiment shows a coaxial counterbalance 60 and drive assembly 40, the counterbalance 60 does not necessarily have to be coaxial with the drive assembly. The counterbalance merely has to produce equal and opposite forces and/or torques to the drive assembly, and any relative configuration between the counterbalance 60 and drive assembly may be used. As long as the centers of mass of the drive assembly 40 and counterbalance 60 coincide, and the forces act along the centerlines of each, additional objects (not shown) can be used to transfer the forces and torques between them.

In use, in a simple case in which the bender tube drive assembly 40 is oscillating in one direction along a single axis, then the outer counterbalance tube 60 will also be oscillating, but 180° out of phase with the inner bender tube drive assembly 40. The counterbalance will have an amplitude of motion that is sufficient to substantially cancel the inner bender tubes forces and torques so that the attachment point 62 will be stationary. If the same principle is applied for more complex inner bender tube drive assembly 40 motions, the outer counterbalance tube 60 may simply "mirror" these motions.

It should be noted that the amplitude motion of the drive assembly 40 and the counterbalance 60 will not necessarily be the same. If the rotational inertias about the attachment point 62 of both of the drive assembly 40 and the counterbalance 60 are the same, then amplitudes will be similar. However, if the rotational inertias of drive assembly 40 and the counterbalance 60 are dissimilar, then dissimilar displacements (and accelerations) will be used.

Figure 5:
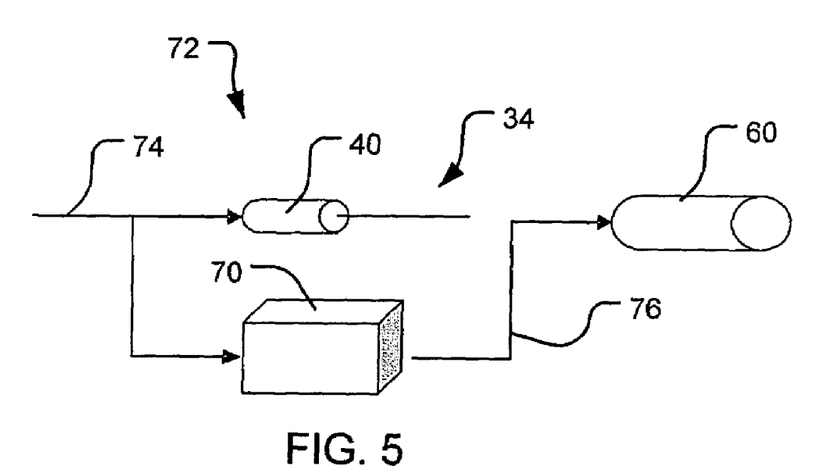
FIG. 5 is a block diagram that illustrates an open-loop control system that is encompassed by the present invention.
Figure 6:
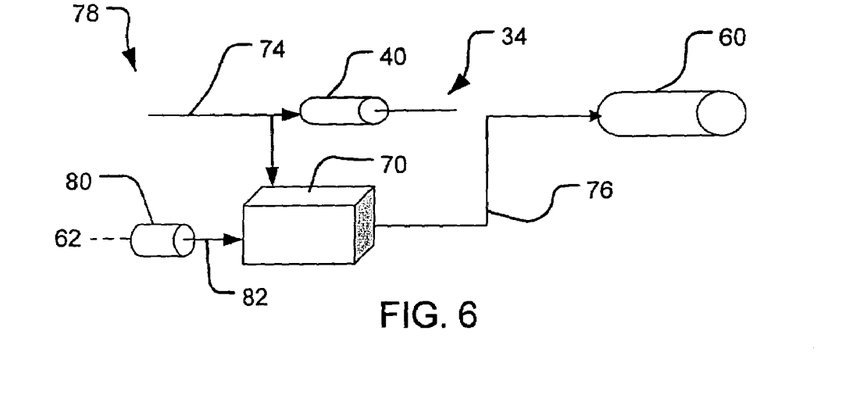
FIG. 6 is a block diagram that illustrates a closed-loop control system that is encompassed by the present invention.
Figure 8:
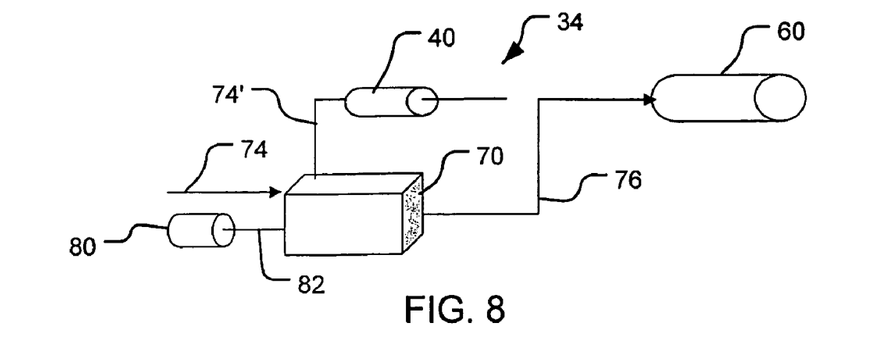
FIG. 8 illustrates a block diagram of a counterbalance system that provides system perturbation compensation.

The counterbalance of the present invention is typically driven with a counterbalance control system 70 (See FIGS. 5, 6, and 8). The counterbalance control system may be part of controller 20 (FIG. 1) or control 70 may be a separate control in base station 12 or coupled to scanning beam device 14. There are two preferred types of controls 70 that may be used to drive counterbalance 60—an open-loop control and a closed-loop control. FIG. 5 shows one exemplary embodiment of an open-loop control system, and FIGS. 6 and 8 shows exemplary embodiments of a closed-loop control system. While the open-loop and closed-loop control are preferred, it may be possible to use other systems to control the counterbalance. For example, it may be possible to simply have a look-up table or chart that is stored in memory that will correspond to the input drive signal that is used to drive the optical fiber.

For ease of reference, FIGS. 5, 6 and 8 illustrate the drive assembly 40 and counterbalance 60 as being separate from each other. However, in the actual configurations, the drive assembly 40 and counterbalance 60 will be coupled to each other, as described above. In the open-loop control system 72 of FIG. 5, an input drive signal 74 is used to directly control the tube bender drive assembly 40 and to generate an output signal 76 to control the counterbalance 60. In the embodiment illustrated in FIG. 5, the input drive signal is sent to both the drive assembly 40 and to control 70. In control 70, an algorithm may be used on the input drive signal 74 to generate an appropriate output drive signal 76 for the counterbalance 60. This algorithm can be a simple math function or it may be a more complex math function. For example, a simple algorithm may just invert the input drive signal 74 and output the inverted drive signal as the output signal 76 to the counterbalance 60. An example of a complex algorithm would be a look-up table that is used for each input drive signal as it varies in time.

Figure 7:
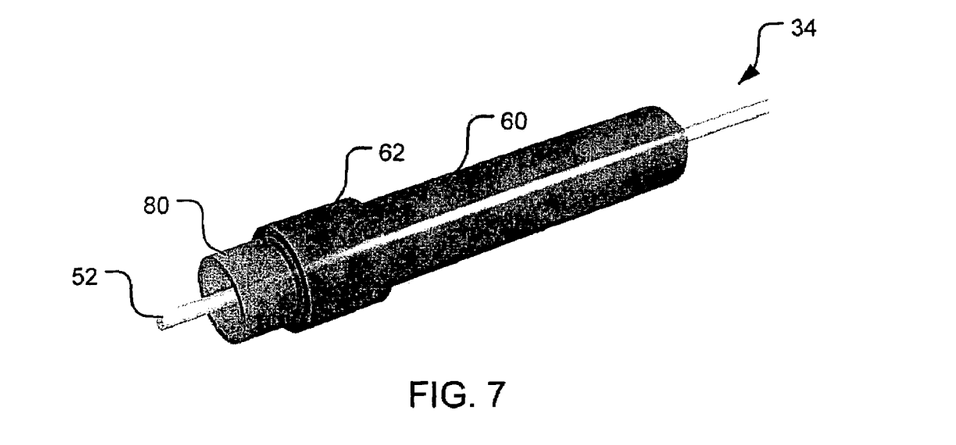
FIG. 7 illustrates an embodiment of a counterbalance that comprises a sensor.

As shown in FIG. 6, a closed-loop control system 78 is similar to open-loop with the exception of the addition of one or more sensors 80. Sensor 80 may be used to detect the motion of the attachment point 62 (shown in FIGS. 3 and 4) between the drive assembly 40 and the counterbalance 60 using inertia. Inertial sensors detect accelerations, typically of a mass in the sensor itself. FIG. 7 shows one embodiment of an inertial sensor 80 as it is coupled to the attachment point 62.

The inertial sensor 80 illustrated in FIG. 7 may be in the form of a tube of piezoelectric material. Similar to the above illustrated piezoelectric drive assembly 40 and piezoelectric counterbalance, the tubular piezoelectric inertial sensor may comprise quadrant electrodes (not shown). However, unlike the drive assembly 40 and the counterbalance 60, the electrodes on the inertial sensor 80 that are not energized, but instead generates an output potential signal (voltage) 82 that is approximately proportional to the amount that the inertial sensor 80 is bent. The mechanism that bends the inertial sensor 80 is typically its own inertia when accelerated. Since the inertial sensor 80 is attached to the attachment point 62 it senses any movement at the attachment point. If there is movement, the inertial sensor 80 is accelerated in a particular direction generating a voltage signal 82 on one or more electrodes from the resultant bending. As shown in FIG. 6, the control 70 receives the generated voltage signal 82 (and the input control signal 74), and using an algorithm stored in control 70, determines the appropriate output drive signal 76 to send to the counterbalance 60. Using this method a nearly motionless attachment point 62 may be realized.

As shown in FIG. 8, in some embodiments a sensor 80 may be used to detect "system" perturbation (e.g., a system perturbation would be a force and/or torque caused by a bumping, rotation, movement, vibration, etc. of the scanning beam device as a whole). Since the optical fiber scanning element 34 acts like a cantilever spring it can flex from its inertia by accelerations. Such systematic forces and/or torques may cause the scanning element 34 to deviate from its intended path of motion (e.g., its scan pattern). To compensate for the system perturbation, sensor 80 may be used to detect these system forces and/or torques and output voltage signals 82 to the control 70 to compensate for the system accelerations. The perturbations from external movement will have a much lower frequency spectrum. A low pass filter (not shown) can be used to separate the higher frequency drive assembly and counterbalance signal from the low frequency perturbations. An algorithm in the control 70 may be configured to (1) generate adjusted drive signals 74' which are then sent to the tube bender drive assembly 40 and/or (2) to generate the output drive signal 76 for driving the counterbalance 60.

Figure 9:
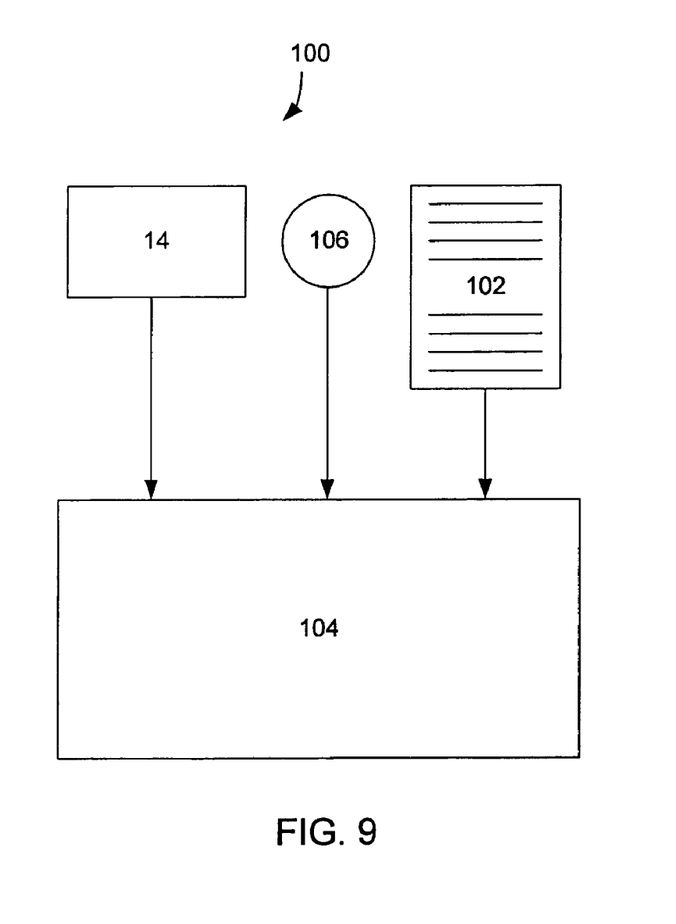
FIG. 9 illustrates a kit encompassed by the present invention.

FIG. 9 illustrates a kit 100 encompassed by the present invention. The kit 100 may include a scanning beam device (SFD) 14 (such as an endoscope), instructions for use (IFU) 102, and at least one package 104. Optionally, the kit 100 may include a computer readable medium (CRM) 106 that is integral with the SFD 14 (such as a non-volatile memory) or separate from the SFD (e.g., CD, DVD, floppy disk, etc.)

The scanning fiber device 14 will generally be as described above, and the instruction for use (IFU) 102 will set forth any of the methods described herein. Package 104 may be any conventional device packaging, including pouches, trays, boxes, tubes, or the like. IFU 102 will usually be printed on a separate piece of paper, but may also be printed in whole or in part on a portion of the package 104.

It is understood that the examples and embodiments described herein are for illustrative purposes only and that various modifications or changes in light thereof will be suggested to persons skilled in the art and are to be included within the spirit and purview of this application and scope of the appended claims. Numerous different combinations are possible, and such combinations are considered to be part of the present invention.

What is claimed is:

1. A scanning beam device comprising:
   a beam scanning element comprising an optical fiber;
   an actuation element coupled to the beam scanning element that generates at least one of a transverse force and a torque to move the optical fiber of the beam scanning element along one or more axes of motion; and
   a counterbalance coupled to the actuation element that generates at least one of a transverse force and torque that is substantially equal and substantially opposite to the transverse force and/or torque generated by the actuation element.

2. The device of claim 1 wherein the actuation element comprises a tube bender that is coupled to a proximal end of the optical fiber,
   wherein the distal end of the optical fiber is free to oscillate in two axes of motion.

3. The device of claim 2 wherein the tube bender comprises a piezoelectric material.

4. The device of claim 1 wherein the counterbalance is substantially coaxial around the actuation element.

5. The device of claim 4 wherein the counterbalance contacts a proximal portion of the actuation element at an attachment point and does not contact a distal portion of the actuation element so as to allow the distal portion of the actuation element to move relative to the counterbalance.

6. The device of claim 4 wherein the counterbalance comprises a piezoelectric material.

7. The device of claim 1 wherein the actuation member comprises patterned quadrant of electrodes.

8. The device of claim 1 wherein the counterbalance comprises patterned quadrants of electrodes.

9. The device of claim 1 wherein the counterbalance is configured to oscillate 180 degrees out of phase with an oscillation of the actuation element.

10. The device of claim 1 comprising an open loop counterbalance control system coupled to the counterbalance that delivers control signals to the counterbalance.

11. The device of claim 1 comprising:
a closed loop counterbalance control system coupled to the counterbalance; and
a sensor coupled to the closed loop counterbalance control system.

12. The device of claim 11 wherein the sensor detects a motion of an attachment point between the actuation element and the counterbalance.

13. The device of claim 12 wherein the sensor comprises a tubular body that comprises a piezoelectric sensor that comprises quadrant electrodes,
wherein movement of the attachment point causes a bending in the sensor and generation of an output potential that is proportional to the amount of bending in the sensor caused by the movement of the attachment point.

14. The device of claim 12 wherein the sensor is positioned proximal of the attachment point.

15. The device of claim 11 wherein the sensor detects accelerations of a mass in the sensor.

16. The device of claim 11 wherein the sensor is configured to detect an acceleration of the scanning beam element, actuation element and the counterbalance.

17. A method of counterbalancing a scanning beam device, the method comprising:
providing a scanning beam device comprising a beam scanning element coupled to an actuation element, and a counterbalance operatively coupled to the actuation element, the beam scanning element comprising an optical fiber;
actuating the optical fiber of the beam scanning element with at least one of a force and torque provided by the actuation element; and
counterbalancing the at least one of the force and torque provided by the actuation element with at least one of a force and torque that is substantially equal and substantially opposite to the at least one of the force and torque provided by the actuation element.

18. The method of claim 17 wherein the actuation element comprises a tube bender that is coupled to a proximal end of the optical fiber,
wherein actuating the beam scanning element comprises oscillating the actuation element and the optical fiber in two axes of motion.

19. The method of claim 18 wherein counterbalancing is carried out by oscillating the counterbalance 180 degrees out of phase with an oscillation of the actuation element.

20. The method of claim 18 wherein the tube bender comprises a piezoelectric material, wherein the force provided by the actuation element is carried out through delivery of an electric control signal from a control system to the actuation element.

21. The method of claim 17 wherein the counterbalance is substantially coaxial around the actuation element.

22. The method of claim 21 wherein the counterbalance contacts a proximal portion of the actuation element at an attachment point and does not contact a distal portion of the actuation element so as to allow the distal portion of the actuation element to move relative to the counterbalance.

23. The method of claim 17 wherein counterbalancing is carried out with an open loop counterbalance control system coupled to the counterbalance that delivers control signals to the counterbalance.

24. The method of claim 17 wherein counterbalancing is carried out with a closed loop counterbalance control system coupled to the counterbalance that detects a motion of an attachment point between the actuation element and the counterbalance,
wherein the closed loop counterbalance control system uses the detected motion to configure a control signal that is used to provide the counterbalancing force to the counterbalance.

25. A scanning beam device comprising:
beam scanning means comprising an optical fiber;
actuation means for generating a force and/or torque to actuate movement of the optical fiber of the beam scanning means; and
counterbalancing means for generating at least one of a counterbalancing force and torque that is substantially equal and substantially opposite to the force and/or torque generated by the actuation means.

* * * * *